(12) United States Patent
Peinado et al.

(10) Patent No.: US 8,074,281 B2
(45) Date of Patent: Dec. 6, 2011

(54) MALWARE DETECTION WITH TAINT TRACKING

(75) Inventors: Marcus Peinado, Bellevue, WA (US); Luis Irun-Briz, Bellevue, WA (US); Laurent S. Visconti, Bainbridge Island, WA (US); Mark L. Niehaus, Seattle, WA (US); Nikola Livic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 12/013,475

(22) Filed: Jan. 14, 2008

(65) Prior Publication Data

US 2009/0183261 A1 Jul. 16, 2009

(51) Int. Cl.
*G06F 12/14* (2006.01)
(52) U.S. Cl. .......................... 726/24; 713/187; 713/188
(58) Field of Classification Search .................. 726/24
See application file for complete search history.

(56) References Cited

U.S. PATENT DOCUMENTS

| | | | |
|---|---|---|---|
| 7,788,235 B1 * | 8/2010 | Yeo | 707/687 |
| 2002/0073323 A1 * | 6/2002 | Jordan | 713/188 |
| 2003/0105973 A1 | 6/2003 | Liang et al. | |
| 2003/0120951 A1 | 6/2003 | Gartside et al. | |
| 2004/0030913 A1 | 2/2004 | Liang et al. | |
| 2004/0034794 A1 | 2/2004 | Mayer et al. | |
| 2004/0230827 A1 | 11/2004 | Franczek et al. | |
| 2005/0188215 A1 | 8/2005 | Shulman et al. | |
| 2005/0216956 A1 | 9/2005 | Orr et al. | |
| 2005/0229254 A1 | 10/2005 | Singh et al. | |
| 2006/0026682 A1 | 2/2006 | Zakas | |
| 2006/0026683 A1 | 2/2006 | Lim | |
| 2006/0037075 A1 * | 2/2006 | Frattura et al. | 726/22 |
| 2006/0085857 A1 | 4/2006 | Omote et al. | |
| 2007/0079378 A1 * | 4/2007 | Itoh | 726/24 |
| 2007/0240215 A1 * | 10/2007 | Flores et al. | 726/24 |
| 2008/0216175 A1 * | 9/2008 | Pike | 726/22 |
| 2009/0172815 A1 * | 7/2009 | Gu et al. | 726/23 |

FOREIGN PATENT DOCUMENTS

WO WO 2006/107712 A2 10/2006

OTHER PUBLICATIONS

Yin et al., "Panorama: Capturing System-wide Information Flow for Malware Detection and Analysis", Nov. 2, 2007, ACM, pp. 116-127.*

Nanda et al., "Dynamic Multi-Process Information Flow Tracking for Web Application Security", Nov. 2007, ACM, pp. 1-20.*

Ho et al., "Pratical Taint-Based Protection using Demand Emulation", Apr. 21, 2006, ACM, pp. 29-41.*

(Continued)

*Primary Examiner* — Matthew Smithers

(57) ABSTRACT

Malware may be identified based on attempts to use tainted data in certain ways, such as by attempting to execute the tainted data, by attempting to modify execution control based on tainted data, or by attempting to apply an existing function to the tainted data. A data's taint is determined based on the location from which the data originates. When data from a tainted source is moved to an otherwise non-tainted destination, the taint may be propagated from the source to the destination, to indicate that the destination is now of unknown safety. A component may be used to observe the operation of a process, in order to determine what data is being moved with respect to the process, and how that data is being used.

19 Claims, 8 Drawing Sheets

OTHER PUBLICATIONS

Kong et al., "Improving Software Security via Runtime Instruction-Level Taint Checking", Oct. 21, 2006, ACM, pp. 18-24.*

Erlingsson, et al., "XFI: software guards for system address spaces" In Proceedings of the 7th Conference on USENIX Symposium on Operating Systems Design and Implementation—vol. 7 (Seattle, WA, Nov. 6-8, 2006). USENIX Ass., Berkeley, CA, 6-6.

Castro, et al., "Securing software by enforcing data-flow integrity". In Symposium on Operating System Design and Implementation (OSDI), Seattle, WA, Nov. 2006.

Wikipedia, "Data Execution Prevention" http://en.wikipedia.org/wiki/Data_Execution_Prevention, Dec. 23, 2007.

Liron, "Adding Software Exceptions in Data Execution Prevention (DEP)". Windows XP Update. Initially retrieved on Jun. 8, 2006; current version (submitted) retrieved on Jan. 3, 2008 from (http://www.updatexp.com/dep-exceptions.html).

Shacham, et al., "On the Effectiveness of Address-Space Randomization", Proceedings of 11th ACM conference on Computer and communications security, pp. 298-307, 2004.

Wikipedia, "Address Space Layout Randomization", http://en.wikipedia.org/wiki/Address_space_layout_randomization, Jan. 1, 2008.

Costa, et al., "Vigilante: End-to-End Containment of Internet Worms", Proc. of 20th ACM Symposium on Operating Systems Principles (SOSP'05), Brighton, UK, Oct. 2005.

"Clavister IDP System", date: 1998-2007, pp. 1-4.

Corman, "Defining the Rules for Preemptive Host Protection: Internet Security Systems' Multi Layered Strategy", Date: 2005, pp. 1-12.

"MailFrontier Enterprise Gateway", date: Apr. 7, 2004, pp. 1-2.

International Search Report and Written Opinion Received for PCT Application No. PCT/US2008/088346, mailed on Sep. 1, 2009, 11 pages.

\* cited by examiner

MALWARE DETECTION WITH TAINT TRACKING

BACKGROUND

Attacks on computer systems are often based on exploitation of security vulnerabilities in the system's software and/or hardware. The complexity of a typical computer system means that vulnerabilities often exist even in systems that are well-designed. When a vulnerability has been found, an attacker can create malware that exploits the vulnerability to cause behaviors that can range from nuisance (e.g., minor performance degradation) to catastrophe (e.g., deletion of data).

Various mechanisms exist to protect systems against malware attacks. Anti-virus ("AV") software uses definitions to detect signatures in existing or incoming data, and/or patterns of software behavior that are consistent with known malware. However, the ability of AV software to detect malware is based on a human analyst's having discovered the malware's tell-tale (i.e., signature) data or behavior. This discovery is made after the malware has already been observed in the wild and has infected machines. Moreover, after the signature data and/or behavior has been discovered by a human, individual machines are unprotected until a definition based on that signature has been created and distributed to client AV engines. In many cases, this process is not fast enough to protect machines. Malware may spread widely before an AV definition can be detected by human analysts and distributed to a large number of machines.

Some protection mechanisms can guard against certain classes of attacks without relying on humans to react to problems. Some operating environments may provide Data Execution Prevention ("DEP"), which allows software to declare certain memory pages as non-executable. Some attacks are based on writing malware code into data pages and then causing a program to execute code from the data pages. If the data pages have been declared non-executable by the program, then DEP may stop the program from executing if the program attempts to execute an instruction located in a data page. However, this technique does not guard against attacks that use existing code in pages that have been declared executable, such as in the case of "return to libc attacks." Address Space Layout Randomization ("ASLR") protects against attacks that rely on the attacker's knowledge of where certain executable code is located. In ASLR, the location of executable code is randomized, so the attacker will not know the layout in memory of processes that could be used to implement an exploit. However, ASLR may be of limited effectiveness. Even if ASLR can defeat some instances of attack, it can be shown that one may wage an attack against an ASLR-protected system, which has some probability of succeeding.

Moreover, a system has been described that detects worms based on the notion that worms infect machines through network traffic, and through data that is derived from network traffic. However, such a system does not address more general types and sources of infection.

SUMMARY

Attackers implement certain types of security exploits by causing a process to execute the attacker's code, or by causing the process to run existing code on the attacker's data. These types of security breaches can be identified and resisted by detecting attempts to execute, or perform other operations on, the attacker's code. Such attempts can be detected by following data as it moves through the system to determine when unsafe or "tainted" data has infected an otherwise safe location, and by observing what actions a process is performing or attempting to perform on data in location that might be infected.

An "ogling" tool observes events in a process to determine what data is being moved from one place to another, and/or to determine what operations are being performed on that data (such as attempting to execute the data). Defining potentially unsafe sources of data, tracking that data as it moves between locations, and observing what actions are being performed on unsafe data, may allow potential attacks to be discovered. Since the analysis of data movement and usage can be performed in real-time, these techniques can be used to detect and resist "zero-day" attacks (i.e., attacks for which no solution has yet been created). However, these techniques can be used to detect and resist attacks that occur in any circumstances or on any time frame.

A component that tracks unsafe data and its usage may be installed on a computer system to be protected. In such a case, the component monitors programs as they execute and, when a potentially unsafe action occurs, the component may take appropriate action to protect the system on which it is running. As another example, such a component may be used on a separate machine to detect potentially unsafe sources of code and/or data and to prepare inoculations against that code and/or data—e.g., by creating and distributing new virus/malware definitions to be distributed to clients when a new source of infection is detected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
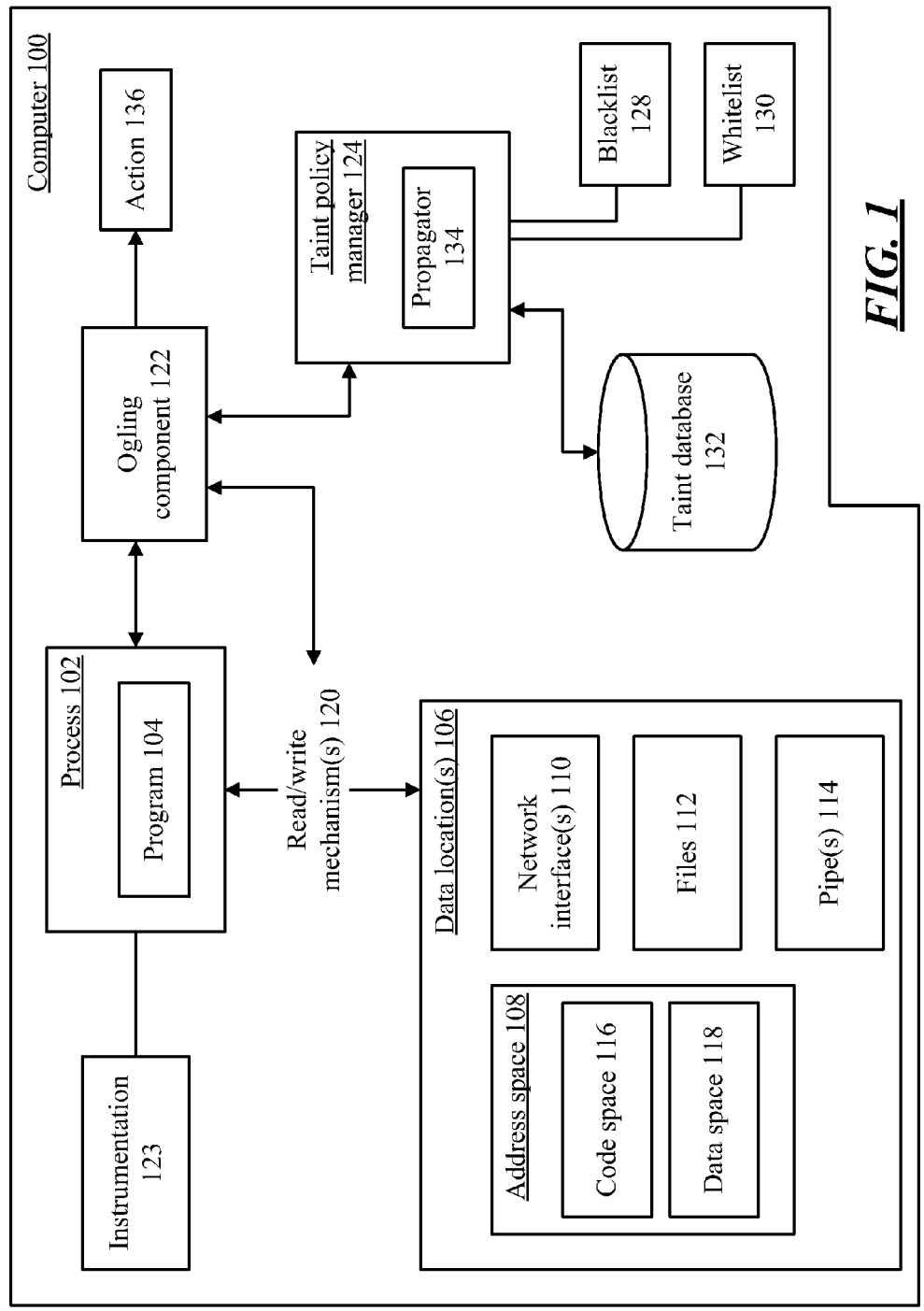
FIG. 1 is a block diagram of a scenario in which an ogling component observes operation of a process and movement of data used with that process.

An attack on a computer system's security is often carried out by causing the system to carry out the will of the attacker. This kind of attack is generally implemented either by delivering the attacker's code to the system and causing a process to execute that code, or by delivering the attacker's data to the system and causing existing code to operate on the attacker's data. One way to prevent security attacks is to detect attempts to execute or operate on potentially unsafe data. Data that is known to be unsafe, or whose safety is not known, may be referred to as "tainted." Certain types of attacks may be prevented by detecting and/or preventing attempts to execute tainted data, and/or attempts to perform certain operations on tainted data. Thus, observing the movement of tainted data through a system, and enforcing policies as to what can be done with such data, may effectively forestall security attacks on a system.

Many traditional techniques for protecting a computer system, such as AV software, are based on tainted data and its consequences having been observed in the wild by a human analyst. The analyst then creates an inoculation against the tainted data (e.g., a virus definition for use with an installed client AV engine), which can then be distributed to computer systems. This technique takes time—sometimes too much time. For example, when a patch (e.g., security update) for an operating system or other software is released, the vulnerability that the patch addresses can be reverse engineered from the patch itself, so the patch effectively publicizes the vulnerability before the patch can be widely distributed. In some cases, malware that exploits the vulnerability that a new patch addresses has been observed in the wild hours after a patch is released. However, it can take days to distribute the patch and/or to create and distribute new virus definitions that protect against the new malware. Detection of malware, by tracking the movement and use of tainted data, can be automated. Thus, this type of detection can be done in real-time on the machine to be protected. The detection could also be done on a separate machine in order to identify the malware, and to create and distribute a solution, faster than could be done by a human analyst. For example, a separate machine could analyze software as it executes, as a sort of automatic generator of virus definition (or other malware definitions). These definitions may then be distributed to clients, providing a relatively fast and efficient way of identifying and inoculating against a variety of malware. In some cases, this way of creating and distributing malware definitions, filters, etc., might allow clients to receive these forms of protection faster than an attacker could reverse engineer an exploit.

Some systems attempt to detect worms by tracking taint that arises from incoming network traffic. A worm is a particular type of malware that propagates through network traffic, such as e-mail. Systems that focus on worm detection are based on the notion that network data of unverified origin may be tainted. Thus these worm-detection systems focus on evaluation of incoming network traffic and, possibly, tracking its movement through a given computer system. However, tainted data may arise from sources other than network traffic, and thus these worm-detection systems are not equipped to deal with a broader class of attacks. As described herein, a system may monitor the movement of data between a several different sources of different kinds, and may track taint arising from any source.

Turning now to the drawings, FIG. 1 shows an example scenario in which the operation of a process, and the movement of data used with that process, is observed by an ogling component. Since "code" is effectively a type of data that is executed, it is to be understood that tracking the movement of "data" includes all types of data, whether that data is code or some other type of data.

Process 102 is a process that exists on a computer 100. A program, such as program 104, may execute in process 102. Process 102 may be associated with certain information, such as a particular virtual address mapping, particular register values, etc., which define process 102's context. Process 102 and/or program 104 may be able to read data from, and write data to, various data location(s) 106. Data location(s) 106 may include, for example, address space 108, network interface(s) 110, file(s) 112, and pipe(s) 114. The data location(s) 106 shown in FIG. 1 are examples of data locations, although process 102 and/or program 104 may be able to access other types of additional or alternative data locations.

Address space 108 comprises virtual memory, which may be mapped to regions of physical memory and/or locations in a page file or swap space on disk. Address space 108 may be specific to process 102 such that only process 102 can access data in address space 108. However, as another example, process 102 and a different process may share access to address space 108. Address space 108 may store code and/or other types of data used by process 102. For example, program 104 may be located in address space 108 while it executes. Address space 108 may have separate spaces for code and data, shown in FIG. 1 as code space 116 and data space 118. Code space 116 may store executable instructions, and data space 118 may store non-instruction data to be operated on. However, it will be understood that, in the subject matter described herein, instructions or any type of data may be stored in any portion of address space 108, whether such portion is designated as code space 116, data space 118, as having some other designation, or as having no designation. An operating system, or some other aspect of an environment present at computer 100, may enforce separate code and data spaces by taking some action if an attempt is made to point computer 100's program counter (or otherwise to execute) code that is outside of code space 116. However, computer 100 does not necessarily enforce such separation. (The program counter, for example, may be the EIP register on a processor based on the INTEL x86 architecture, but the subject matter herein covers any machine or other system regardless of processor architecture.)

Network interface(s) 110 are components through which data can be communicated between computer 100 and the world outside of computer 100. For example, network interface(s) 110 may allow computer 100 to write data to, and/or read data from, networks that connect computer 100 to other computers or other devices. Examples of such networks include wide-area networks (such as the Internet), local-area networks (e.g., a corporate or other organizational Ethernet), public or private Wi-Fi networks, etc.

File(s) 112 are locations in which data is stored. File(s) 112 may exist on a disk, flash memory, or various types of devices that use electronic, magnetic, optical, semi-conductor, etc., technology for storage of data. As discussed below, many computing environments, such as that which may be present at computer 100, allow for file mapping, in which a file is mapped to a region of virtual memory. This mapping allows the file to be accessed through memory access routines. However, the subject matter described herein applies to a file, regardless of whether the file is mapped to memory, and regardless of the manner in which the file is accessed.

Pipe(s) 114 are constructs though which data is passed between different processes. For example, an operating system (or other component of an operating environment) may implement a feature through which the output of one process is used as the input of another process. Such pipe(s) are often encountered through the vertical bar symbol, which is implemented by various Linux and Unix shells, and by the command-line interpreter provided with the MICROSOFT WINDOWS operating systems. When a command such as "a|b" is executed, a pipe is set up such that program b receives the output of program a as program b's input. Thus, a pipe is an example of a data location to which data may be written, or from which data may be read.

Process 102 accesses data location(s) 106 through one or more read/write mechanism(s) 120. Read/write mechanisms 120 may take the form of input/output (I/O) system calls, native memory access instructions that are built into hardware present at computer 100, or other mechanisms. For example, read/write mechanism(s) 120 may include system calls that read or write files, that set up pipes, that map files to virtual memory, that read/write data from/to a network device, or machine instructions that move data from one location in memory to another or between memory and a register. To the extent that data is moved from one place to another through read/write mechanism(s) 120, observing the movement of data may involve observing the operation of read/write mechanism(s) 120.

Ogling component 122 may observe events that happen within process 102 and/or may observe movement of data within computer 100. For example, if data from a network is moved into process 102's address space, or into a register, or from one of data location(s) 106 to another of data location(s) 106, this movement of data may be observed by ogling component 122. Instrumentation 123 may assist ogling component 122 in observing these events. Instrumentation 123 may take any form, although a particular example of instrumentation 123 is described below in connection with FIG. 7.

Taint policy manager 124 determines which data is to be considered tainted. (In FIG. 1, taint policy manager 124 is shown as a separate component from ogling component 122. However, taint policy manager 124 and ogling component 122 could be the same component, or could be implemented in any other configuration.) Taint policy manager 124 may apply a policy. An example of such a policy is that data received from a public network, or data in an unauthenticated file, is to be considered tainted. Taint policy manager 124 may take into consideration various assertions of taint or non-taint, such as blacklist 128 and/or whitelist 130. Blacklist 128 identifies data, or sources of data, that are known to provide unsafe data, or that are to be considered tainted by virtue of what is not known about these data or their sources. Whitelist 130 identifies data that is to be trusted as safe (e.g., because the data has been previously verified to be safe). For example, a particular Uniform Resource Locator (URL) may be known to provide unsafe data, and therefore may be included on blacklist 128. As another example, a particular URL, or a particular set of files signed by a trusted authority, may have been verified to provide safe data, and thus may be included on whitelist 130. Data locations may be included on blacklist 128 and/or whitelist 130 for any reason. Moreover, the use of blacklist 128 and/or whitelist 130 optional, since taint policy manager 124 may take any factors into consideration in deciding what data is to be considered tainted or non-tainted.

Taint database 132 maintains records indicating which data locations are to be considered tainted. For example, taint database 132 may contain records indicating which files, network sources, memory pages, etc., are to be considered tainted. Example contents of taint database 132 discussed below in connection with FIG. 2. Taint policy manager 124 may use taint database 132 to determine which pages are currently considered tainted. Blacklist 128 and whitelist 130 may contain records that identify which data locations are tainted (or non-tainted), and thus could be stored in taint database 132.

When data is copied from a tainted source to a non-tainted destination, the destination may be considered tainted by virtue of having received tainted data. The notion that a data destination inherits taint from the data source may be referred to as "taint propagation." Taint policy manager 124 may include propagator 134, which records, in taint database 132, the fact that a data location has become tainted by virtue of having received tainted data.

Taint policy manager 124 may learn, from ogling component 122, that tainted data has moved to a non-tainted location. In one example, ogling component 122 reports to taint policy manager 124 the fact that data has moved from one location to another. Taint policy manager 124 determines, based on blacklist 128, whitelist 130, and/or the contents of taint database 132, whether the source and/or destination of the moved data are considered tainted. If the data is being moved from a tainted source location to a non-tainted destination location, then propagator 134 records, in taint database 132, that the destination location is now tainted.

As noted above, ogling component 122 may observe the movement of data from one location to another, and may also observe other types of actions, such as an attempt to execute tainted data. For example, ogling component 122 may observe that the program counter in process 102 has been pointed to a particular location. Ogling component 122 may then consult taint policy manager 124 to determine whether the location to which the program counter has been pointed is tainted. Taint policy manager, in turn, may consult taint database 132 to determine whether the memory location to which the program counter has been pointed is to be considered tainted. Similarly, ogling component 122 may observe that the program counter has been changed based on data that is stored in a tainted location (e.g., by copying a value from a tainted location into the program counter), and this change might indicate an attack even if the resulting value of the program counter does not contain a tainted address. As previously noted, an attempt to execute tainted data suggests the possibility of an attack, and the use of tainted data to modify the program counter may similarly suggest the possibility of an attack. Thus, ogling component 122 may take action 136 in response to such a perceived or suspected attack. Examples of action 136 are to raise an exception, halt execution of process 102, generate a malware definition to be distributed to other machines, etc.

It is noted that, since ogling component 122 may access to events inside of process 102, it could be used to implement various types of protection techniques such as DEP or ASLR. For example, ogling component 122 could be used to observe attempts to execute data from a page that is not marked executable and could take appropriate action. Moreover, ogling component 122 could be given a form of access to process 102 that would allow it to move code and data around in process 120's address space, in order to implement a form of ASLR. Moreover, since ogling component 122 can detect various forms of execution control tampering (e.g., attempts to execute tainted data, attempts to move tainted data into the program counter), this execution control detection could be used in a variety of context, such as qualifying a service's (or other program's) execution branches that are based on input from a network, file, keyboard, etc.

Figure 2:
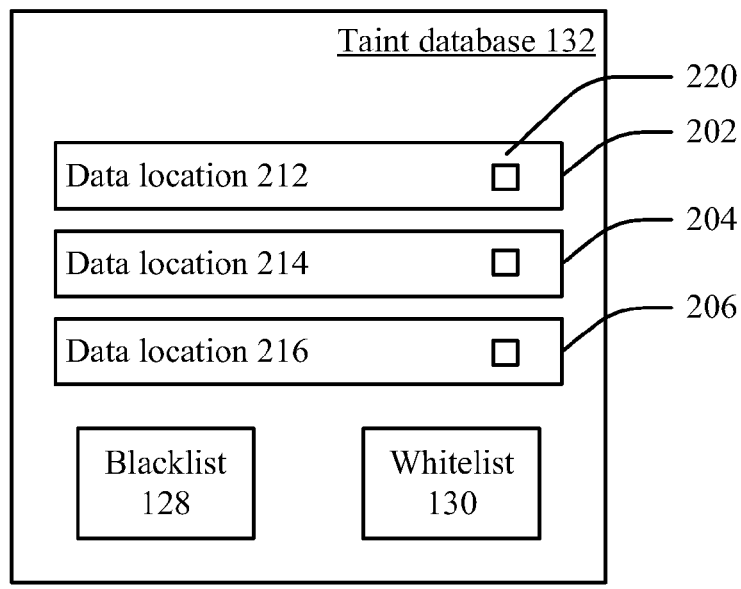
FIG. 2 is a block diagram of a taint database.

FIG. 2 shows an example of taint database 132. In this example, taint database 132 contains records indicating whether a particular data location is tainted. In FIG. 2, three such records, 202, 204, and 206, are shown, although taint database may contain any number of records. Example records 202, 204, and 206 indicate whether three example data locations, 212, 214, and 216, are tainted. The indication of taint is shown, in FIG. 2, as a check box 220, which can be either checked or unchecked, although the indication that a particular location is tainted may be recorded in any manner.

As noted above in connection with FIG. 1, taint database 132 may also contain blacklist 128 and/or whitelist 130, which, in this example, are shown as being stored in taint database 132.

The data locations to which records 202, 204, and 206 relate may be any types of data locations, recorded at any level of granularity. For example, data location 212 may refer to all network locations, a particular group of network locations, or a specific network location. Similarly, that data location could refer to a directory of files, a particular file, a particular block of a file, etc. As other examples, a data location could be a particular page of memory, a particular range of pages, a particular register, etc. However, the notion of what locations are tainted is defined at the level of granularity at which such taint is recorded. For example, suppose that taint is recorded at page-granular level. If one byte of data is moved from a first (tainted) page to a second (non-tainted) page, then the second page may be considered tainted. Thus, it might be said that "first data" (e.g., the one byte) is moved from a first location to a second location, and that "second data" obtained from the second location (after the move occurs) is considered tainted. The "second data" might be the same as (or include) the first data that was moved, or it might not. Once the second location is tainted by a byte from the first location, the data in the second location is considered tainted, whether or not that bytes was actually the one that had been moved from the first location.

Figure 3:
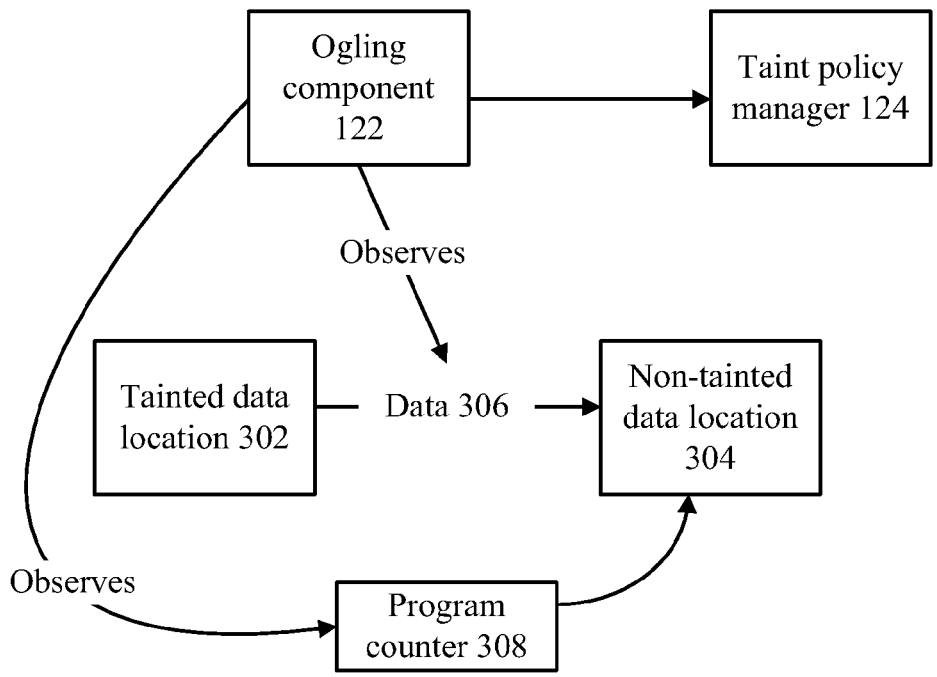
FIG. 3 is a block diagram of a scenario in which taint is propagated from one data location to another data location.

FIG. 3 shows a scenario in which taint is propagated from one data location to another, and also shows an example consequence of that propagation. In FIG. 3, there is initially a tainted data location 302 and a non-tainted data location 304. These data locations may be any types of data locations, such as files, network locations, pipes, memory regions, etc., as mentioned above. At some point, data 306 from tainted data location 302 is moved (e.g., transferred, copied, etc.) to non-tainted data location 304. This movement is observed by ogling component 122, which communicates the movement to taint policy manager 124. (As previously noted, ogling component 122 and taint policy manager 124 may be the same component, although they are shown herein as conceptually separate components.) Taint policy manager 124 may record the movement of data in the manner previously described—e.g., by using propagator 134 (shown in FIG. 1) to record, in taint database 132 (shown in FIG. 1), the newly-acquired taint of data location 304. At this point, the previously non-tainted data location 304 is considered tainted by virtue of having received tainted data.

The fact that data location 304 is now tainted might have no particular consequence, and thus may simply be recorded for later reference. However, as noted above, certain types of attacks are based on certain uses of tainted data, such as attempting to execute the data. In the example of FIG. 3, program counter 308 points to the next instruction to be executed. If the program counter acquires a value such that the next instruction to be executed is in (now tainted) data location 304, this fact is observed by ogling component 122. Ogling component 122, in cooperation with taint policy manager 124, determines that the program counter is pointed to a now-tainted data location. Thus, ogling component 122 may take appropriate action (e.g., action 136, shown in FIG. 1). Similarly, ogling component 122 may observe that the value of the program counter has been changed using data that comes from a tainted location (regardless of whether the resulting address stored in the program counter is in a tainted location). For example, ogling component 122 may cause an exception to be raised, halt execution, generate a malware definition, etc., in order to forestall what may be an attack based on an attempt to execute tainted data (or to use tainted data in some way to modify execution control). Other types of events performed on tainted data may also cause ogling component 122 to take action. For example, if tainted data is moved into the space reserved for arguments to a function (as might occur in a return-to-libc attack), this fact may likewise be determined by ogling component 122, and ogling component 122 may then take appropriate action.

Figure 4:
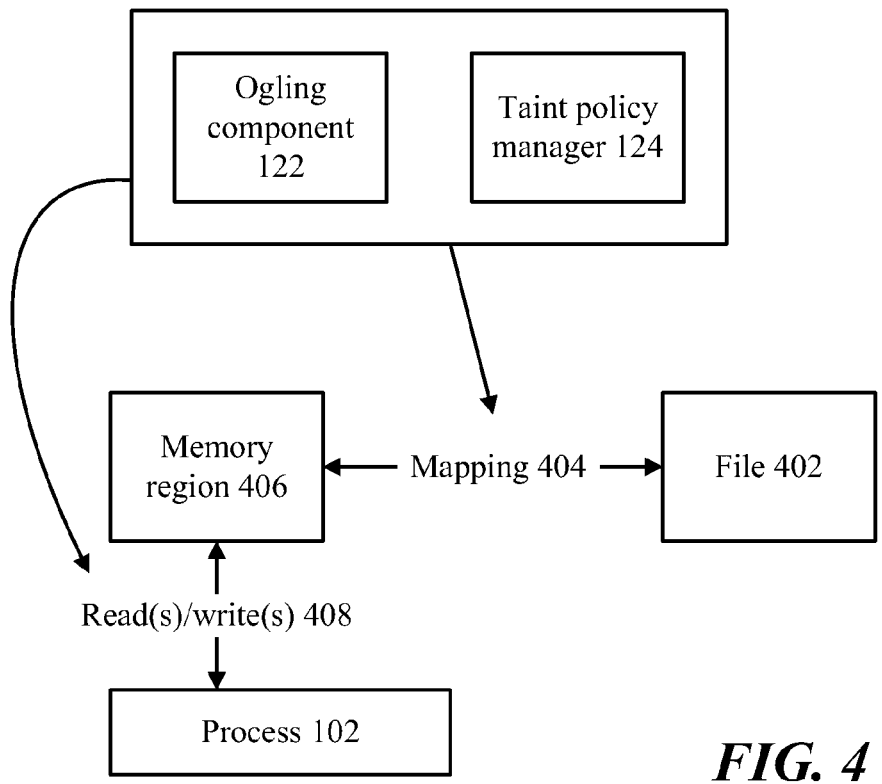
FIG. 4 is a block diagram of a file mapping scenario.

As previously noted, some operating environments provide support for file mapping, in which a file is mapped to a memory region and access to the file is made by reading and/or writing the memory region. In order for ogling component 122 and/or taint policy manager 124 (both shown in FIG. 1) to implement the notion of taint propagation, support for mapped files may be provided. An example of observing and recording operations on mapped files is shown in FIG. 4.

File 402 is a file that exists, for example, on a disk, flash drive, etc. There may be a mapping 404 between memory region 406 and file 402. Thus, process 102 may perform input/output operations on file 402 by performing reads/writes 408 with memory region 406. Thus, when such a mapping 404 exists, any taint attributed to memory region 406 is also attributed to file 402, and vice versa. For example, if data from a tainted location is placed into memory region 406, then memory region 406 is considered tainted. Moreover, mapping 404 causes this data to be placed in file 402, so file 402 is also considered to be tainted. Similarly, if file 402 receives tainted data in some manner outside of the mapping, then memory region 406 would also be tainted by that data. Ogling component 122 and taint policy manager 124 (whether separate components or a single component) observe reads/writes 408 that involve memory region 406, and they are also aware of mapping 404. In this way, ogling component 122 and taint policy manager 124 can propagate taint to memory region 406 and file 402 if either of these data locations receives data from a tainted source.

Additionally, some operating environments provide support for sharing memory between processes. However, if one process performs a write that taints the memory, then a mechanism may be used to communicate, to the other process, the fact that a particular memory region has become tainted. An example scenario in which this taint is communicated is shown in FIG. 5.

Figure 5:
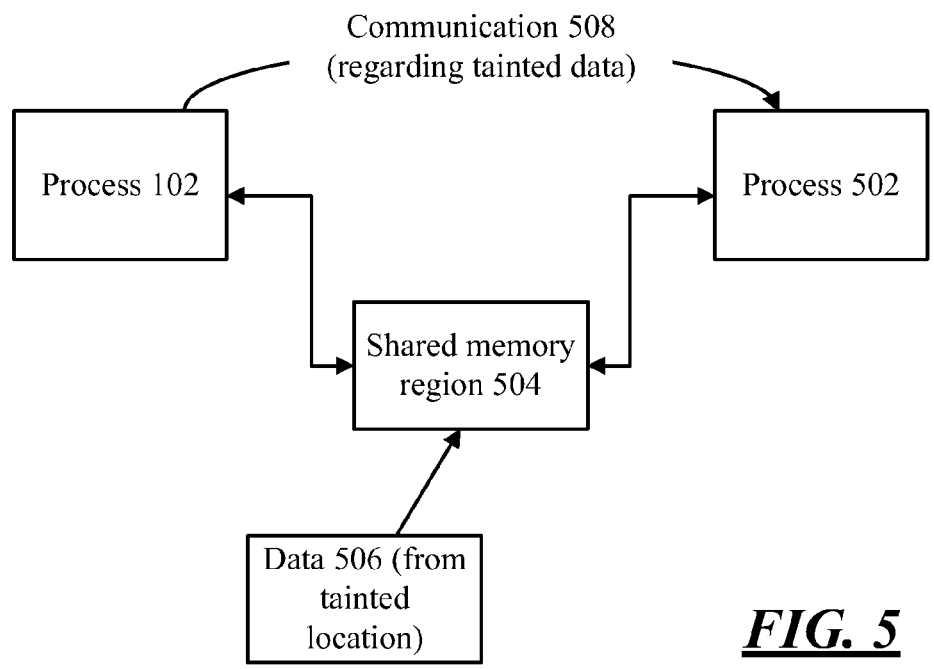
FIG. 5 is a block diagram of a shared memory scenario.

In FIG. 5, processes 102 and 502 have shared access to memory region 504. One of the processes (e.g., process 102) may cause data 506 from a tainted location to be written into memory region 504. An ogling component and/or taint policy manager that is observing process 102 may then mark memory region 504 as a tainted data location. However, memory region 504 is now tainted not only with respect to process 102, but also with respect to process 502. Thus, communication 508 is performed to communicate, to process 502, the fact that memory region 504 has become tainted, so that the taint may be considered in dynamic data flow analysis with respect to process 502.

Figure 6:
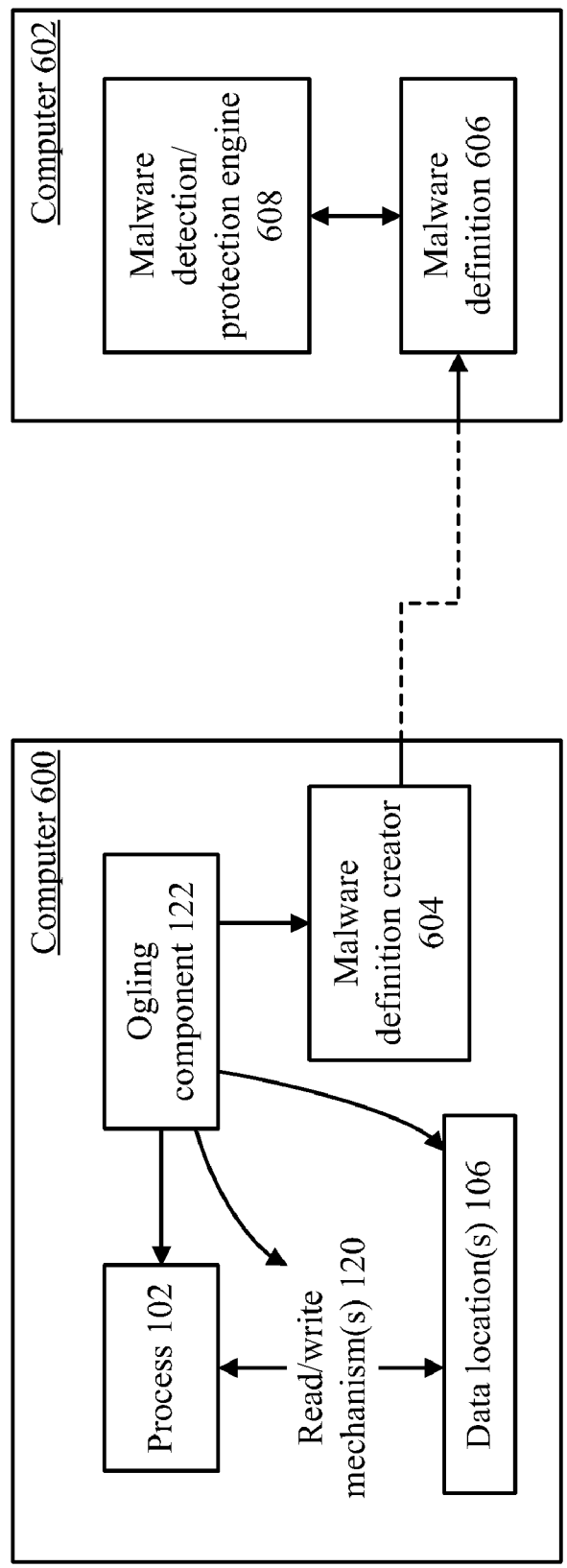
FIG. 6 is a block diagram of a scenario in which an ogling component is used to observe a process on one machine, in order to create a malware definition to be distributed to another machine.

As shown in FIG. 1, an ogling component may observe a process on a machine on which the ogling component is running, in order to protect that machine. However, an ogling component may also observe a process on one machine, in order to create protection (such as virus definitions, or other malware definitions) to be distributed to other machines in order to protect those other machines. FIG. 6 shows a scenario in which an ogling component is used to observe a process on one machine in order to create malware definitions to be distributed to other machines.

In FIG. 6, process 102 runs on computer 600. Process 102 has access to data location(s) 106, which may include files, pipes, network interfaces, address spaces, etc., as shown in FIG. 1 and discussed above. These data location(s) 106 may be read and/or written by read/write mechanism(s) 120. Ogling component 122 may observe operation of process 102, as well as the use of read/write mechanisms 120 to move data among data location(s) 106. Ogling component 122 may include, or work with, other components shown in FIG. 1, such as a taint policy manager, a propagator, and a taint database.

When ogling component 122 discovers, through observation, that process 102 is attempting to use tainted data in a particular way (e.g., by attempting to execute that data, by attempting to use tainted data as arguments to a function, etc.), ogling component 122 may find that the software in process 102 is suspect of being a form of malware. Ogling component 122 may then inform malware definition creator 604, which creates a definition 606 of the suspect software. Malware definition 606 may then be distributed to one or more other machines, such as computer 602. Malware definition 606 may then be used by a malware detection/protection engine 608 that operates on computer 602, in order to protect computer 602 against the malware that was discovered on computer 600. Computer 602 may be remote to computer 600, but could be at any location. For example, malware detection/protection engine 608 may be anti-virus software that runs on a computer, and malware definition 606 may be a definition file (or other recognition criteria) used by the anti-virus software. Thus, ogling component 122 may be used as a type of virus definition generator (or other malware definition generator), as a possible substitute for the human analysts who create virus/malware definitions.

Figure 7:
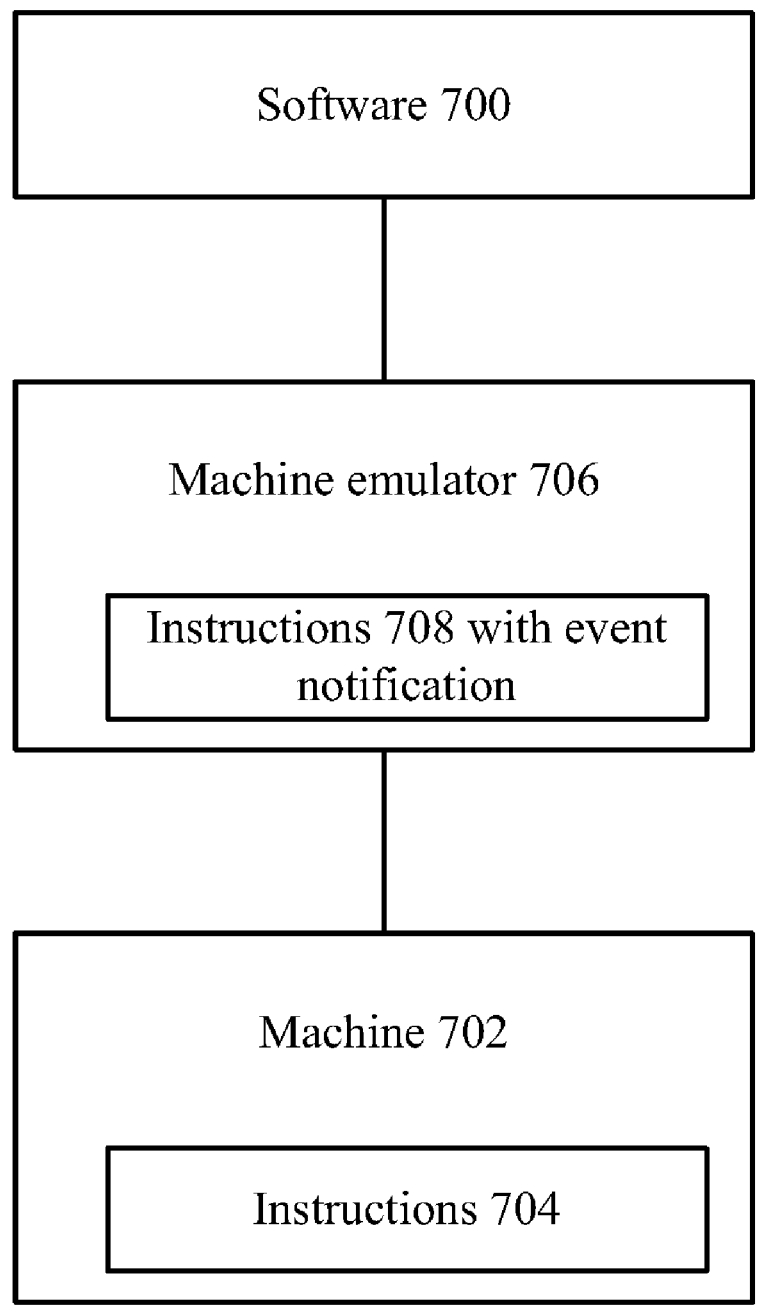
FIG. 7 is a block diagram of a type of instrumentation.

As previously noted, instrumentation may be used to allow an ogling component to observe events in a process. FIG. 7 shows an example of such instrumentation.

Software 700 is a program that is executable on a machine 702. Machine 702 has a set of instructions 704 that machine 702 is able to execute. Software 700, therefore, may be a binary that uses instructions 704, or some subset thereof. Machine emulator 706 comprises software that implements and exposes instructions 708, which are a version of instructions 704. Thus, machine emulator 706 is able to execute a program that would otherwise be executable on machine 702. Since software 700 is executable on machine 702, it is also executable on machine emulator 706. However, instructions 708 are implemented in such a manner that they may notify of certain events that occur during execution of software 700. For example, if, during execution of software 700, the program counter register is set to point to a particular memory location, instructions 708 would set the value of the program counter register on machine emulator 706, but could also issue a notification that the program counter had been set, and of the particular value to which the program counter had been set. This notification could be received by an ogling component, which could then determine whether the program counter has been pointed at a data location that has been marked for taint (or whether the program counter has been set using tainted data).

While a machine emulator is shown in FIG. 7 as an example of how an ogling component could learn of events occurring in a process, ogling component can observe its target process, and data movement with respect to that target process, in any manner and using any mechanisms. For example, instrumentation of a program to allow observation by an ogling component could be performed by rewriting the observed program's binary to allow ogling component to be notified of events. These are merely examples; an ogling component, and/or the instrumentation that allows the ogling component to observe events, could be implemented in any manner.

Figure 8:
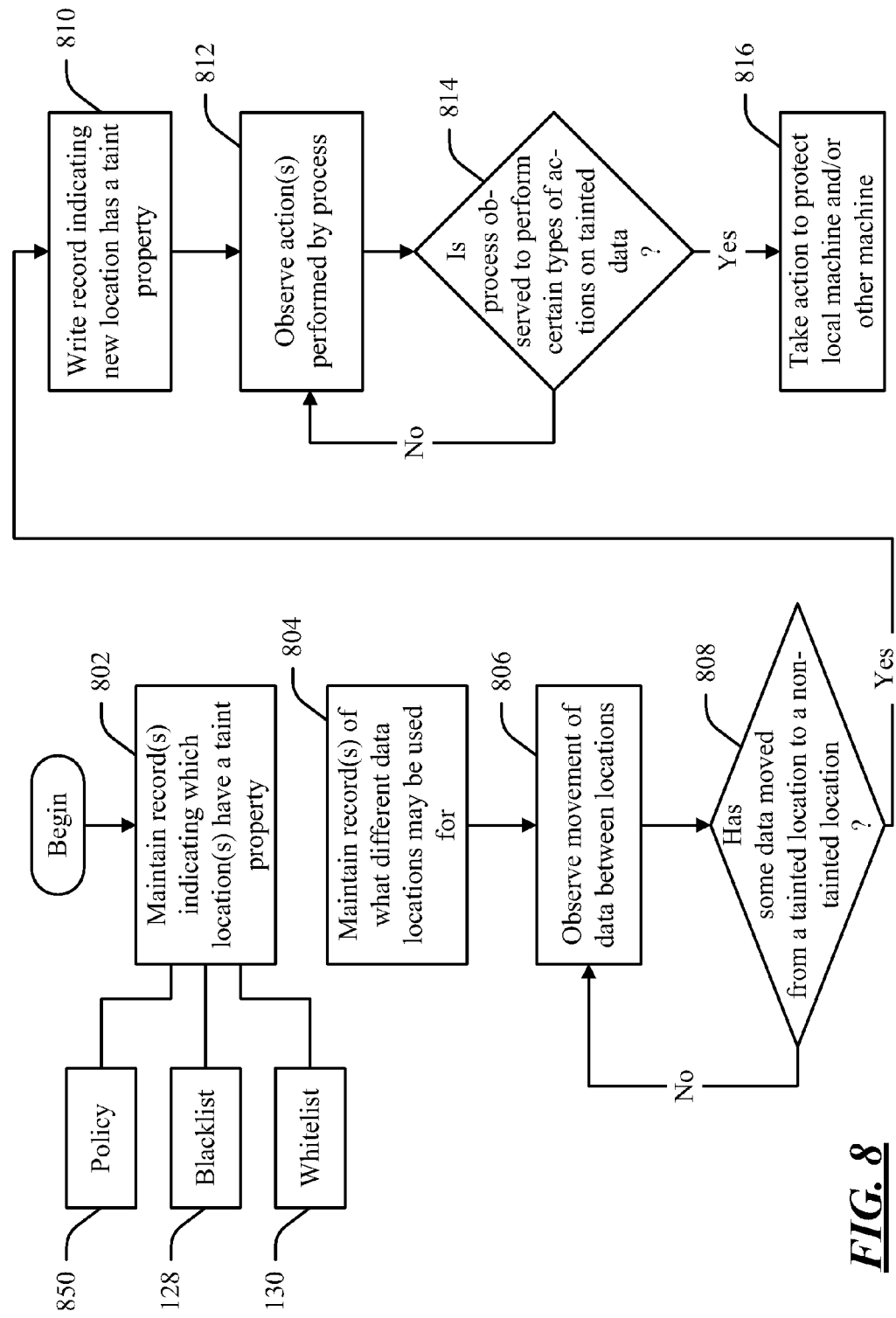
FIG. 8 is a flow diagram of a process in which activity that poses a potential threat is detected through tracking of tainted data.
Figure 9:
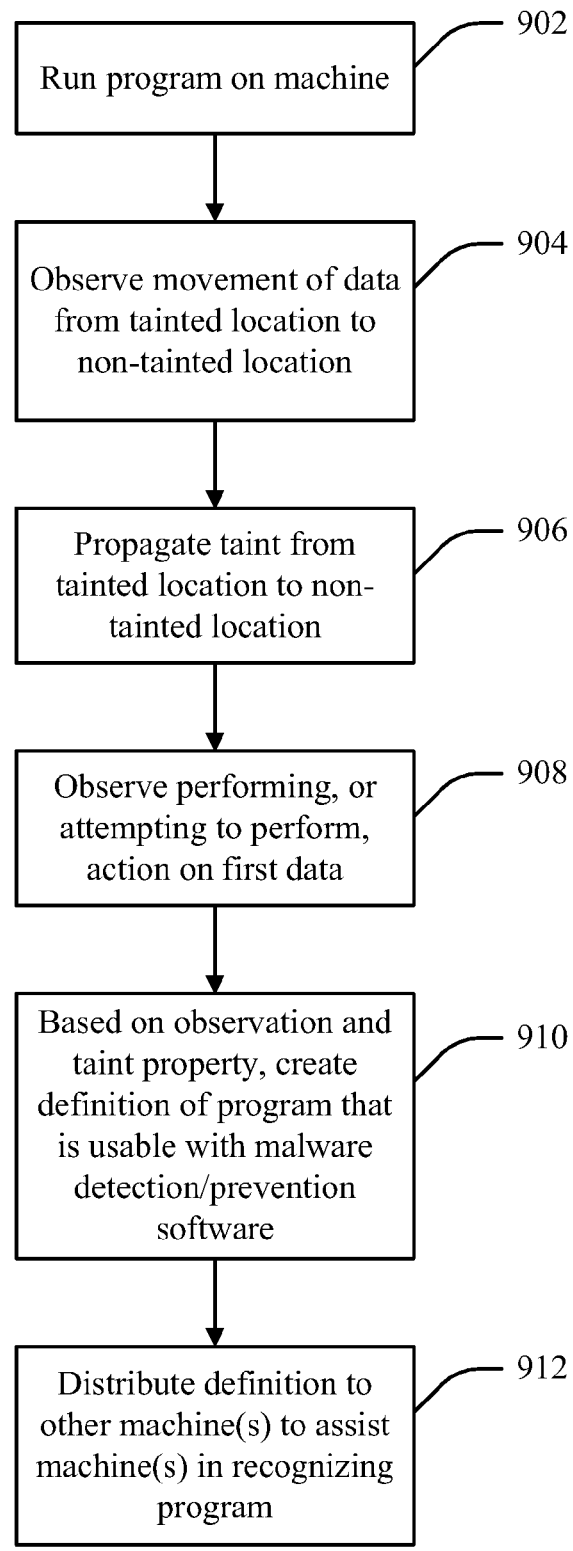
FIG. 9 is a flow diagram of a process in which malware is detected on one machine, and malware definitions are created for distribution to other machines.

FIGS. 8 and 9 show example processes and/or methods. These processes are described, by way of example, with reference to components described herein, although these processes may be carried out in any system and are not limited to the components and scenarios described herein. Additionally, each of the flow diagrams in FIGS. 8 and 9 shows an example in which stages of a process are carried out in a particular order, as indicated by the lines connecting the blocks, but the various stages shown in these diagrams can be performed in any order, or in any combination or sub-combination.

Turning now to FIG. 8, there is shown a process in which a potentially harmful activity is detected using the tracking of tainted data. At 802, one or more records are maintained indicating which location(s) have a taint property. (As discussed above, a data location may be considered tainted, and a location's state of having been determined to be tainted may sometimes be referred to herein as a taint property.) A determination of which data locations are tainted or non-tainted may initially be determined with reference to a policy 850, blacklist 128, and/or whitelist 130. For example, policy 850 may state that public network locations in general are tainted and that signed files are not tainted. Blacklist 128 may list particular signed files that are to be considered tainted, and whitelist 130 may list particular public network locations that are not to be considered tainted. These are some examples of how policy 850, blacklist 128, and/or whitelist 130 may interact.

There may be records indicating what different memory regions may be used for, and these records may be maintained at 804. For example, there may be records stating that certain pages of memory are for executable code, and that others are for non-executable data.

At 806, movement of data between locations is observed. If it is observed that data has moved from a tainted location to a non-tainted location (as determined at 808), then a record is written indicating that a new location has the taint property. For example, if data is copied from a first memory page that has the taint property to a second memory page that does not have the taint property, then a record relating to the second memory page (e.g., in a taint database) may be written (e.g., created or updated) to reflect that the second memory page has the taint property (at 810). If it is not observed that data has moved from a tainted location to a non-tainted location (e.g., if no data has moved, or if data has moved to an already-tainted location, or if data has moved from a non-tainted location to another non-tainted location), then observation may continue (at 806) without writing a taint record.

At 812, actions performed by a process are observed. If it is observed that certain types of actions are being performed on tainted data (as determined at 814), then a responsive action is taken (at 816). (If it is not observed that such certain types of actions are being performed, then observation continues at 812.) Examples of actions performed on tainted data that might trigger responsive action include: attempting to execute tainted data, attempting to call a function with tainted data as its arguments, attempting to execute data from a non-executable memory page, etc. The particular responsive action taken may be based on the context in which the method is being performed. For example, if the method of FIG. 8 is being performed on a machine in order to protect that machine, then the responsive action may include raising an exception, halting execution, etc. If the method of FIG. 8 is being performed on a machine that creates malware definitions for other machines, then the responsive action may be to create and distribute a malware definition that facilitates recognition of the software in which a problem occurred. Any type of action may be performed at 816.

FIG. 9 shows an example process in which malware is detected, and malware definitions are created for distribution to other machines. At 902, a program is run on a machine. During running of the program, movement of data from tainted locations to non-tainted locations may be observed (at 904). When such observations are made, the taint is propagated from the tainted location to the non-tainted location (at 906), for example by creating and/or updating records in a taint database.

At some point, it may be observed (at 908) that the program is performing, or attempting to perform, a particular types of action on tainted data—e.g., by pointing the program counter at the tainted data to execute the tainted data, by moving tainted data into the program counter, by attempting to use the tainted data as arguments to a function, etc. If it is observed that the program is performing such action then, it may be determined that the program represents a type of malware. If the program is believed to be malware, then a definition of the program may be created (at 910) for use with software that detects and/or resists malware (e.g., anti-virus software). This definition may then be distributed (at 912) to one or more other machines, to assist those machines in detecting or impeding the discovered malware.

Figure 10:
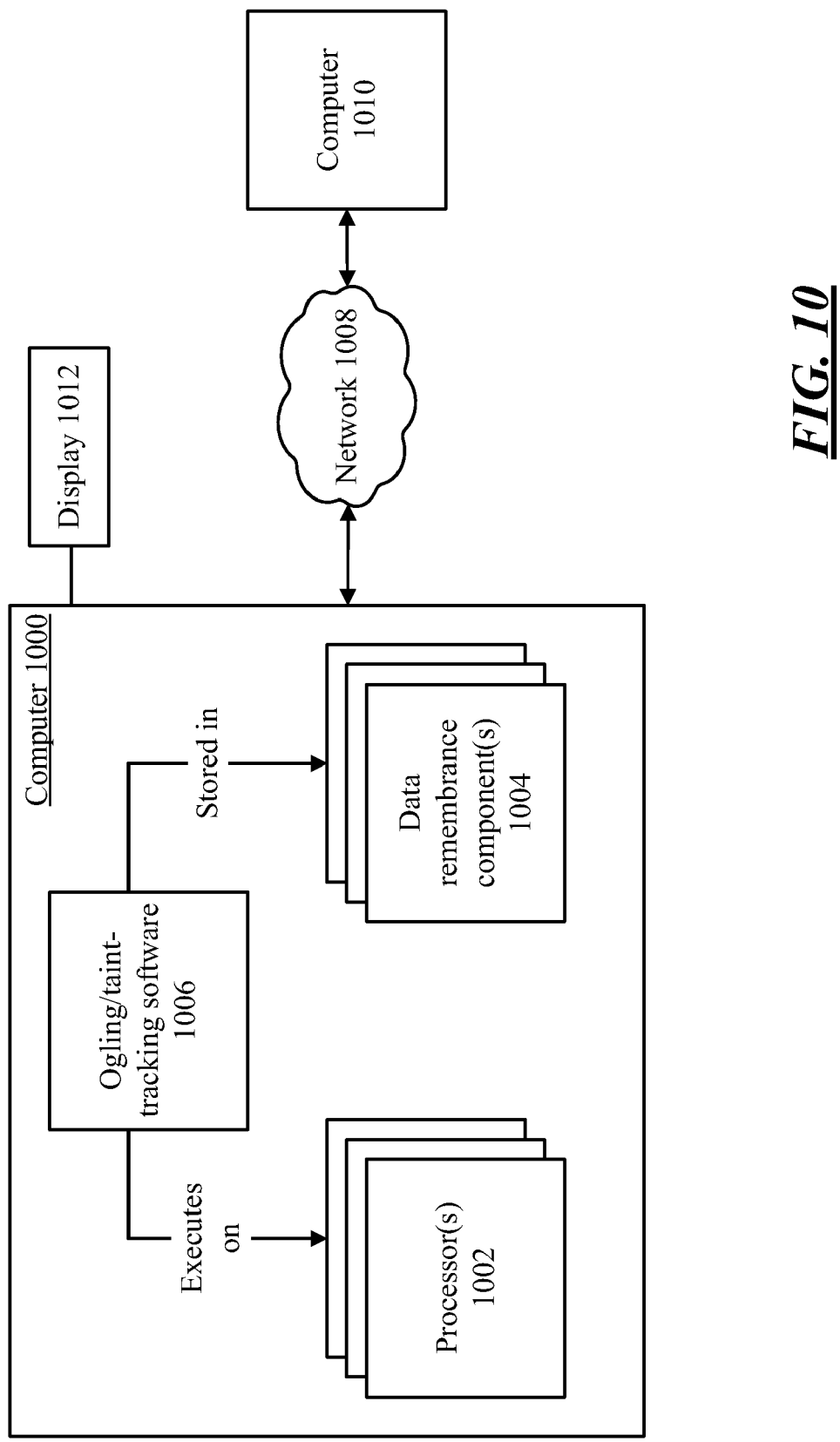
FIG. 10 is a block diagram of example components that may be used in connection with implementations of the subject matter described herein.

FIG. 10 shows an example environment in which aspects of the subject matter described herein may be deployed.

Computer 1000 includes one or more processors 1002 and one or more data remembrance components 1004. Processor(s) 1002 are typically microprocessors, such as those found in a personal desktop or laptop computer, a server, a handheld computer, or another kind of computing device. Data remembrance component(s) 1004 are components that are capable of storing data for either the short or long term. Examples of data remembrance component(s) 1004 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 1000 may comprise, or be associated with, display 1012, which may be a cathode ray tube (CRT) monitor, a liquid crystal display (LCD) monitor, or any other type of monitor.

Software may be stored in the data remembrance component(s) 1004, and may execute on the one or more processor(s) 1002. An example of such software is ogling/taint-tracking software 1006, which may implement some or all of the functionality described above in connection with FIGS. 1-9, although any type of software could be used. Software 1006 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 10, although the subject matter described herein is not limited to this example.

The subject matter described herein can be implemented as software that is stored in one or more of the data remembrance component(s) 1004 and that executes on one or more of the processor(s) 1002. As another example, the subject matter can be implemented as software having instructions to perform one or more acts, where the instructions are stored on one or more computer-readable storage media.

In one example environment, computer 1000 may be communicatively connected to one or more other devices through network 1008. Computer 1010, which may be similar in structure to computer 1000, is an example of a device that can be connected to computer 1000, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media comprising executable instructions to perform a method, the method comprising:
   maintaining a first record indicating that a first location has a taint property, said first location storing or providing first data;
   determining that at least some of said first data has been written from said first location to a second location;
   based on said determining, writing a second record indicating that said second location has said taint property;
   observing that a first process, which exists on a first machine, has performed, is performing, or is attempting to perform, a first action on second data that is in said second location; and
   based on both said observing and on said second location's having said taint property, taking a second action that either: (a) protects said first machine from said first action, or (b) generates information that is usable to protect a second machine from said first action, said second machine being at a location remote to said first machine, or (c) does both (a) and (b).

2. The one or more computer-readable storage media of claim 1, wherein said second location is a memory region that is mapped to a file, and wherein the method further comprises:
   based on both said determining and on a fact of said second location being mapped to said file, writing a third record indicating that said file has said taint property.

3. The one or more computer-readable storage media of claim 1, wherein said second location is a memory region that is accessible to said first process and to a second process, wherein writing of said first data to said second location arises in said first process, and wherein the method further comprises:
   communicating to said second process that said memory region has become tainted.

4. The one or more computer-readable storage media of claim 1, wherein said first location comprises at least one non-network source.

5. The one or more computer-readable storage media of claim 1, wherein said first action comprises writing, to a program counter, an address that is in said second location or a value that comes from said second location.

6. The one or more computer-readable storage media of claim 1, wherein said first action comprises using said second data as one or more arguments to a function.

7. The one or more computer-readable storage media of claim 1, further comprising:
   maintaining one or more records specifying a use to which a given data location relates.

8. The one or more computer-readable storage media of claim 7, wherein said second location is not specified for execution use, wherein said first action comprises attempting to execute data from said second location, and wherein said taking of said second action is further based on an attempt to execute data from a location that is not marked for execution.

9. A method of protecting a first machine, the method comprising:

running a program on a second machine;

observing an action of said program that performs, or attempts to perform, an operation on first data;

based on said observing, and based on said first data being in a first location that has a taint property, creating a definition of said program that is usable with client software that is executable on the first machine and that detects, or impedes, or detects and impedes, malware that meets one or more recognition criteria and that runs on the first machine; and distributing, said definition to the first machine to be used as at least part of said one or more recognition criteria.

10. The method of claim 9, further comprising:

observing movement of second data from a second location, which has said taint property, to said first location; and based on observing of said movement of said second data, propagating said taint property from said second location to said first location.

11. The method of claim 10, wherein said first location is a memory region that is mapped to a file, and wherein the method further comprises:

based on observing of said movement of said second data, and on said memory region being mapped to said file, propagating said taint property from said second location to said file.

12. The method of claim 10, wherein said first location is a memory region that is accessible both to a first process in which said program runs, and to a second process, wherein movement of said second data to said first location arises in said first process, and wherein the method further comprises:

communicating to said second process that said memory region has become tainted.

13. The method of claim 9, wherein said first location comprises at least one non-network source.

14. The method of claim 9, further comprising:

determining that said first location has said taint property based on consultation of a blacklist or a whitelist.

15. A system comprising:

one or more data remembrance components; and one or more executable components that observe movement of data from a first location that is tainted to a second location that is non-tainted, that mark said second location as being tainted after observing said movement, that observe, after said movement, a first action performed with respect to data that is located in said second location, and that take a second action based on said first action being performed on data from a tainted data location, said second action comprising creating a definition of a program in which said first action arises, said definition being usable by client systems that detect or resist malware.

16. The system of claim 15, further comprising:

a taint database into which said one or more executable components write one or more records indicating whether locations are tainted.

17. The system of claim 15, wherein said one or more executable components further comprise:

a propagation component that determines to mark said second location as being tainted based on from which one or more other locations data has been moved into said second location.

18. The system of claim 15, further comprising:

instrumentation that allows said one or more executable component to observe actions that are performed by a program that executes on said system.

19. The system of claim 18, wherein said instrumentation comprises an emulator that exposes a first set of instructions that emulates a second set of instructions that is native to a machine on which said program is configured to execute, said first set of instructions providing notification of at least some events that relate to execution of said first set of instructions.

* * * * *